United States Patent
Nie et al.

(10) Patent No.: US 11,200,382 B2
(45) Date of Patent: Dec. 14, 2021

(54) PROSODIC PAUSE PREDICTION METHOD, PROSODIC PAUSE PREDICTION DEVICE AND ELECTRONIC DEVICE

(71) Applicant: Baidu Online Network Technology (Beijing) Co., Ltd., Beijing (CN)

(72) Inventors: Zhipeng Nie, Beijing (CN); Yanyao Bian, Beijing (CN); Zhanjie Gao, Beijing (CN); Changbin Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 64 days.

(21) Appl. No.: 16/870,053

(22) Filed: May 8, 2020

(65) Prior Publication Data

US 2021/0133396 A1 May 6, 2021

(30) Foreign Application Priority Data

Oct. 30, 2019 (CN) .......................... 201911046827.5

(51) Int. Cl.
*G06F 40/30* (2020.01)
*G06N 3/04* (2006.01)
*G06N 3/08* (2006.01)

(52) U.S. Cl.
CPC .............. *G06F 40/30* (2020.01); *G06N 3/04* (2013.01); *G06N 3/08* (2013.01)

(58) Field of Classification Search
CPC ............ G06F 40/30; G06N 3/04; G06N 3/08
See application file for complete search history.

(56) References Cited

U.S. PATENT DOCUMENTS 5,357,596 A * 10/1994 Takebayashi ............. G06F 3/16
704/251
6,269,329 B1 * 7/2001 Nordstrom ............ G10L 13/027
704/1

(Continued)

FOREIGN PATENT DOCUMENTS

CN           1938756 A       3/2007
CN         101000764 A       7/2007
(Continued)

OTHER PUBLICATIONS

Office action dated May 18, 2021 for Japanese Patent Application No. 2020-083945.

(Continued)

*Primary Examiner* — Kevin Ky
(74) *Attorney, Agent, or Firm* — Quinn IP Law (57) ABSTRACT

This application discloses a prosodic pause prediction method, a prosodic pause prediction device and an electronic device. The specific implementation scheme includes: obtaining a first matrix by mapping a to-be-tested text sequence through a trained embedding layer, where the to-be-tested text sequence includes a to-be-tested input text and an identity of a to-be-tested speaker; inputting the first matrix into a trained attention model, and determining a semantic representation matrix by the trained attention model; and, performing prosodic pause prediction based on the semantic representation matrix and outputting a prosodic pause prediction result of each word in the to-be-tested input text.

13 Claims, 5 Drawing Sheets

(56) References Cited

U.S. PATENT DOCUMENTS

| | | | |
|---|---|---|---|
| 2005/0182625 A1* | 8/2005 | Azara | G10L 15/22 704/236 |
| 2006/0074670 A1 | 4/2006 | Weng et al. | |
| 2007/0203703 A1 | 8/2007 | Yoshida | |
| 2007/0260461 A1 | 11/2007 | Marple et al. | |
| 2010/0217582 A1* | 8/2010 | Waibel | G10L 15/22 704/7 |
| 2015/0254238 A1* | 9/2015 | Waibel | G06F 40/30 704/4 |
| 2015/0371626 A1 | 12/2015 | Li | |
| 2017/0004825 A1 | 1/2017 | Mishra et al. | |
| 2020/0065384 A1* | 2/2020 | Costello | G06N 3/0454 |
| 2020/0137001 A1 | 4/2020 | Wu et al. | |
| 2021/0074305 A1* | 3/2021 | Gopala | G06F 21/30 |

FOREIGN PATENT DOCUMENTS

| | | |
|---|---|---|
| CN | 101000765 A | 7/2007 |
| CN | 101189659 A | 5/2008 |
| CN | 102231278 A | 11/2011 |
| CN | 104916284 A | 9/2015 |
| CN | 105225658 A | 1/2016 |
| CN | 107451115 A | 12/2017 |
| CN | 108536679 A | 9/2018 |
| CN | 109844741 A | 6/2019 |
| CN | 110223671 A | 9/2019 |
| CN | 110265028 A | 9/2019 |
| JP | 2000056786 A | 2/2000 |
| JP | 2003084787 A | 3/2003 |
| JP | 2005345846 A | 12/2005 |
| JP | 2016004267 A | 1/2016 |
| JP | 2019032529 A | 2/2019 |

OTHER PUBLICATIONS

Rui Liu, Hui Zhang, Feilong Bao, Yonghe Wang, Guanglai Gao,"Phonologically Aware BiLSTM Model for Mongolian Phrase Break Prediction with Attention Mechanism", https://www.researchgate.net/publication/325694021, posted Apr. 25, 2019; presented at The 15th Pacific Rim International Conference on Artificial Intelligence (PRICAI2018) At: Inner Mongolia University, Jun. 2018.

Chunhui Lu, Pengyuan Zhang, Yonghong Yan,"Self-Attention Based Prosodic Boundary Prediction for Chinese Speech Synthesis", China, p. 7035-7039, 2019 IEEE International Conference on Acoustics and Speech and Signal Processing.

First office action dated Jul. 2, 2020 for Chinese application No. 201911046827.5.

* cited by examiner

PROSODIC PAUSE PREDICTION METHOD, PROSODIC PAUSE PREDICTION DEVICE AND ELECTRONIC DEVICE

CROSS-REFERENCE TO RELATED APPLICATION

This application claims the benefit and priority of Chinese Application No. 201911046827.5, filed on Oct. 30, 2019, the disclosures of which are incorporated in their entirety by reference herein.

TECHNICAL FIELD

The present application relates to the field of machine learning technology in computer technology, and in particular to a prosodic pause prediction method, a prosodic pause prediction device and an electronic device.

BACKGROUND

In speech synthesis systems, prosodic pause prediction is an indispensable important part. In actual speech signals, different pause levels are corresponding to pauses of different lengths. Different speakers have different prosodic pause characteristics.

Currently, one prosodic pause prediction model is for one speaker, that is, each speaker is corresponding to one prediction model (i.e., a single-speaker prediction model); while for multi-speaker multi-prediction models (that is, there are multiple prediction models for multiple speakers), the prediction modules of various speakers are independent of each other. The prediction model has low generalization ability due to limitations of the speaker, and then it is difficult to perform accurate semantic analysis on a text to obtain accurate text semantic information, i.e., easily resulting in a low accuracy of the prosodic pause prediction.

SUMMARY

The present application provides a prosodic pause prediction method, a prosodic pause prediction device and an electronic device, to solve the problem of low accuracy of prosodic pause prediction results.

In a first aspect, one embodiment of the present application provides a prosodic pause prediction method, including:

obtaining a first matrix by mapping a to-be-tested text sequence through a trained embedding layer; wherein the to-be-tested text sequence includes a to-be-tested input text and an identity of a to-be-tested speaker;

inputting the first matrix into a trained attention model, and determining a semantic representation matrix by the trained attention model; and performing prosodic pause prediction based on the semantic representation matrix and outputting a prosodic pause prediction result of each word in the to-be-tested input text.

One embodiment of the present application has the following advantages or beneficial effects: improving accuracy of prosodic pause prediction. This is because in the prediction process, on the basis of the to-be-tested input text, the identity of the to-be-tested speaker is added. The first matrix is obtained by using the trained embedding layer to map the to-be-tested text sequence which includes the to-be-tested input text and the identity of the to-be-tested speaker. Thus, the identity of the to-be-tested speaker is considered in the obtained first matrix. Then, the to-be-tested speaker is considered in procedures that the trained attention model determines the semantic representation matrix according to the first matrix. Understandably, combined with the identity of the to-be-tested speaker, the unified trained attention model can deal with determination of the semantic representation matrix of the text for different speakers, thereby avoiding limitations of the speaker and improving generalization ability of the attention model. The attention model may be applied to semantic analysis of text for different speakers and improve the accuracy of the semantic representation matrix, i.e., improving the accuracy of the semantic information of the text, and then improving the accuracy of prosodic pause prediction. In this way, the technical problem of low accuracy of prosodic pause prediction can be overcome and the accuracy of prosodic pause prediction can be improved. In other words, in this embodiment, the unified trained model can be used to deal with the prosodic pause prediction of the text for different speakers, the generalization ability is improved, and the semantic analysis ability is also improved, and the prediction accuracy is improved.

Optionally, the method further includes: obtaining a trained prediction model by performing model training based on N first preset training text sequences and M second preset training texts;

wherein N and M are integers greater than 1; the first preset training text sequence includes a first preset training text and an identity of a first training speaker; the trained prediction model includes the trained embedding layer, the trained attention model and a trained output model; an input of the trained embedding layer includes the to-be-tested text sequence; an input of the trained attention model includes an output of the trained embedding layer; an input of the trained output model includes an output of the attention model; an output of the trained output model includes the prosodic pause prediction of each word in the to-be-tested input text.

The obtained trained prediction model can be applied to different speakers, thereby improving the accuracy of the trained prediction model.

Optionally, the obtaining a trained prediction model by performing model training based on N first preset training text sequences and M second preset training texts, includes:

obtaining an initial language model by performing model training according to the M second preset training texts; wherein the initial language model includes an initial embedding layer and an initial attention model, and an input of the initial attention model includes an output of the initial embedding layer;

obtaining the trained prediction model by training a to-be-trained prediction model based on the N first preset training text sequences; wherein the to-be-trained prediction model includes a to-be-trained output model and the initial language model, and an input of the to-be-trained output model includes an output of the initial language model.

The trained prediction model is obtained by performing trainings through the second preset training text and the first preset training text sequence including the identity of the first training speaker, and thus the performance of the prediction model can be improved, thereby improving prediction accuracy of the prediction model in the process of obtaining prosodic pause prediction result via prediction.

Optionally, the performing prosodic pause prediction based on the semantic representation matrix and outputting a prosodic pause prediction result of each word in the to-be-tested input text, includes:

based on the semantic representation matrix, outputting the prosodic pause prediction result of each word in the to-be-tested input text by a trained output model;

wherein the trained output model includes a trained dense layer and a trained output layer; an input of the trained dense layer includes the semantic representation matrix; an input of the trained output layer includes an output of the trained dense layer; an output of the trained output layer includes the prosodic pause prediction result of each word in the to-be-tested input text.

Based on the semantic representation matrix, the prosodic pause prediction result can be output by the dense layer and the output layer, thereby improving the accuracy of the prosodic pause prediction result.

Optionally, before the inputting the first matrix into a trained attention model, the method further includes:

determining a position matrix of the to-be-tested text sequence based on a position of each word in the to-be-tested text sequence in the to-be-tested text sequence; and updating the first matrix by adding the position matrix to the first matrix.

Not only the identity of the to-be-tested speaker is considered on basis of the to-be-tested input text, but also position information of the to-be-tested text sequence is considered. In other words, both the speaker and position of to-be-tested text sequence are considered, thereby improving the prediction accuracy of the prediction process.

In a second aspect, one embodiment of the present application provides a prosodic pause prediction device, including:

a mapping module configured to map a to-be-tested text sequence through a trained embedding layer to obtain a first matrix; wherein the to-be-tested text sequence includes a to-be-tested input text and an identity of a to-be-tested speaker;

a semanteme determination module configured to input the first matrix into a trained attention model and determine a semantic representation matrix by the trained attention model; and an output module configured to perform prosodic pause prediction based on the semantic representation matrix and output a prosodic pause prediction result of each word in the to-be-tested input text.

Optionally, the device further includes:

a training module configured to perform model training based on N first preset training text sequences and M second preset training texts to obtain the trained prediction model;

wherein N and M are integers greater than 1; the first preset training text sequence includes a first preset training text and an identity of a first training speaker; the trained prediction model includes the trained embedding layer, the trained attention model and a trained output model; an input of the trained embedding layer includes the to-be-tested text sequence; an input of the trained attention model includes an output of the trained embedding layer; an input of the trained output model includes an output of the attention model; an output of the trained output model includes the prosodic pause prediction of each word in the to-be-tested input text.

Optionally, the training module includes:

a first training sub-module configured to perform model training according to the M second preset training texts to obtain an initial language model; wherein the initial language model includes an initial embedding layer and an initial attention model, and an input of the initial attention model includes an output of the initial embedding layer;

a second training sub-module configured to train a to-be-trained model based on the N first preset training text sequences to obtain the trained prediction model; wherein the to-be-trained model includes a to-be-trained output model and the initial language model, and an input of the to-be-trained output model includes an output of the initial language model.

Optionally, the output module is configured to, based on the semantic representation matrix, output the prosodic pause prediction result of each word in the to-be-tested input text by a trained output model;

wherein the trained output model includes a trained dense layer and a trained output layer; an input of the trained dense layer includes the semantic representation matrix; an input of the trained output layer includes an output of the trained dense layer; an output of the trained output layer includes the prosodic pause prediction result of each word in the to-be-tested input text.

Optionally, the device further includes:

a position obtaining module configured to, determine a position matrix of the to-be-tested text sequence based on a position of each word in the to-be-tested text sequence in the to-be-tested text sequence, before the semantic determination module inputs the first matrix into the trained attention model and determines the semantic representation matrix by the trained attention model;

an updating module configured to update the first matrix by adding the position matrix to the first matrix.

In a third aspect, one embodiment of the present application provides an electronic device, including:

at least one processor; and a memory in communication with the at least one processor;

wherein the memory stores instructions executable by the at least one processor, the instructions are executed by the at least one processor to enable the at least one processor to perform the method of various embodiments of the present application.

In a fourth aspect, one embodiment of the present application provides a non-transitory computer-readable storage medium including computer instructions stored thereon; wherein the computer instructions are configured to enable a computer to perform the method of various embodiments of the present application.

BRIEF DESCRIPTION OF THE DRAWINGS

The drawings are used for a better understanding of the present solution, and do not constitute a limitation of the present application.

DETAILED DESCRIPTION

Exemplary embodiments of the present application will be described in detail hereinafter with reference to the accompanying drawings. Various details of the embodiments of the present application are provided to facilitate understanding, and they should be considered as merely exemplary. Therefore, those of ordinary skill in the art should recognize that various changes and modifications may be made to the embodiments described herein without departing from the scope and spirit of the present application. Similarly, for clarity and conciseness, description of well-known functions and structures are omitted in the following description.

Figure 1:
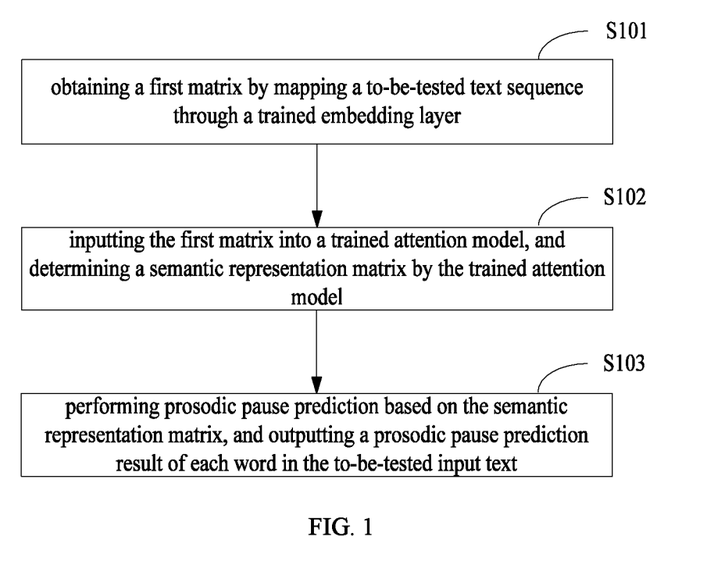
FIG. 1 is a schematic flowchart of a prosodic pause prediction method according to an embodiment of the present application.

As shown in FIG. 1, according to an embodiment of the present application, the present application provides a prosodic pause prediction method, including following steps.

Step S101: obtaining a first matrix by mapping a to-be-tested text sequence through a trained embedding layer.

The to-be-tested text sequence includes a to-be-tested input text and an identity of a to-be-tested speaker. The embedding layer may be used for dimensionality reduction, i.e., mapping a target to a low-dimensional output through a mapping table. The process of mapping in the embedding layer may be understood as an encoding process, which can encode the target as a low-dimensional vector while retaining its meaning. In this embodiment, the first matrix may be obtained by using the embedding layer to encode the to-be-tested text sequence which includes the to-be-tested input text and the identity of the to-be-tested speaker. The first matrix includes a text encoding matrix of the to-be-tested input text and an encoding vector of the identity of the to-be-tested speaker. The text encoding matrix is a matrix obtained by mapping the to-be-tested input text through the embedding layer. The encoding vector of the identity of the to-be-tested speaker is a vector obtained by mapping the identity of the to-be-tested speaker through the embedding layer. In one example, the to-be-tested input text may include T words, and T may be an integer greater than zero. Each word may be mapped to a corresponding encoding vector through the embedding layer, and then a combination of the encoding vectors of T words in the to-be-tested input text forms the above text encoding matrix. In one example, in the to-be-tested text sequence, the number of identities of the to-be-tested speaker may be two, the two identities of the to-be-tested speaker are the same, and the to-be-tested input text may be between the two identities of the to-be-tested speaker. Then, in the first matrix, the number of coding vectors of the identity of to-be-tested speaker is two and the two coding vectors are the same. In other words, the first matrix includes two identical coding vectors of the to-be-tested speaker; and in the first matrix, the text encoding matrix may be between the two coding vectors of the to-be-tested speaker, i.e., the two coding vectors of the to-be-tested speaker are at a head and a tail of the first matrix, respectively.

In one example, the above to-be-tested input text may be a text input by a user, that is, the user inputs a text requiring for prosodic pause prediction. The above identity of the to-be-tested speaker may also be an identity of a speaker, which is input by the user; that is, the user inputs the speaker, for whom predicting prosodic pause of the text is to be performed, i.e., predicting prosodic pause of the to-be-tested text input text under the speaker. In other words, the above to-be-tested text sequence may be a text sequence input by the user, that is, the user inputs the to-be-tested input text requiring for prosodic pause prediction and the identity of the corresponding to-be-tested speaker. After receiving the input text sequence, prosodic pause of the to-be-tested input text in the input text sequence under the identity of the input speaker may be predicted, then, the first matrix is first obtained by mapping the to-be-tested text sequence through the embedding layer.

Step S102: inputting the first matrix into a trained attention model, and determining a semantic representation matrix by the trained attention model.

Semantic information of the text can be analyzed by the trained attention model, that is, the semantic representation matrix can be determined via semantic analysis performed by the trained attention model. The semantic representation matrix may be understood as text semantic information. In one example, the attention model is a transformer model, which can perform semantic analysis of the text to obtain a semantic representation matrix, i.e., text semantic information. The transformer model has powerful semantic modeling capabilities and can bidirectionally model text sequences, i.e., bidirectional encoding. The transformer model can refer to context information of the first matrix, and then obtain a semantic representation matrix that can accurately express semantic features of the to-be-tested text sequence. Further, the transformer model is not limited by length and position of the text sequence.

S103: performing prosodic pause prediction based on the semantic representation matrix, and outputting a prosodic pause prediction result of each word in the to-be-tested input text.

After obtaining the semantic representation matrix of the to-be-tested text sequence, the prosodic pause prediction can be performed based on the semantic representation matrix to obtain the prosodic pause prediction result of each word in the to-be-tested input text, thereby implementing text prosodic pause prediction. In one example, based on the semantic representation matrix, the prosodic pause prediction result of each word in the to-be-tested input text may be output through a trained output model, that is, the output model has been trained in advance. An input of the trained output model includes an output of a trained self-attention model. After the trained self-attention model determines the semantic representation matrix, the trained self-attention model can output the semantic representation matrix to the trained output model, and then the trained output model outputs the prosodic pause prediction result of each word in the to-be-tested input text. In the above process of determining the first matrix, the to-be-tested speaker is considered, and the semantic representation matrix is the text semantic information of the to-be-tested text sequence for the to-be-tested speaker, so that the output prosodic pause prediction result is corresponding to the to-be-tested speaker, that is, the prosodic pause result is the prosodic pause prediction result of the to-be-tested text sequence for the to-be-tested speaker.

In the above prosodic pause prediction process according to one embodiment of the present application, on the basis of the to-be-tested input text, the identity of the to-be-tested speaker is added. The first matrix is obtained by using the trained embedding layer to map the to-be-tested text sequence which includes the to-be-tested input text and the identity of the to-be-tested speaker. Thus, the identity of the to-be-tested speaker is considered in the obtained first matrix. Then, the to-be-tested speaker is considered in procedures that the trained attention model determines the semantic representation matrix according to the first matrix and prosodic pause prediction is performed based on the semantic representation matrix to obtain the prosodic pause prediction result. Understandably, combined with the identity of the to-be-tested speaker, the unified trained attention model can deal with determination of the semantic representation matrix of the text for different speakers, thereby avoiding limitations of the speaker and improving generalization ability of the attention model. The attention model may be applied to semantic analysis of text for different speakers and improve the accuracy of the semantic representation matrix, i.e., improving the accuracy of the semantic information of the text, and then improving the accuracy of prosodic pause prediction.

In an embodiment, before obtaining a first matrix by mapping a to-be-tested text sequence through a trained embedding layer, the method further includes:

obtaining the trained prediction model by performing model training based on N first preset training text sequences and M second preset training texts;

N and M are integers greater than 1. The first preset training text sequence includes a first preset training text and an identity of a first training speaker. The trained prediction model includes the trained embedding layer, the trained attention model and the trained output model. An input of the trained embedding layer includes the to-be-tested text sequence. An input of the trained attention model includes an output of the trained embedding layer. An input of the trained output model includes an output of the attention model. An output of the trained output model includes the prosodic pause prediction of each word in the to-be-tested input text.

The training process of the prediction model in this embodiment is the training of the embedding layer, the attention model and the output model. Obtaining the trained prediction model after the training of the prediction model is completed, means that the training of the embedding layer, the attention model and the output model is completed, and then the trained embedding layer, the trained attention model and the trained output model are obtained. The training process adopts the first preset training text sequence including N first preset training texts and identities of M first training speakers for the first preset training texts, where values of N and M may be selected according to application scenario or actual needs, which is not limited herein. Each first preset training text may include multiple words. Each first preset training text has an identity of one corresponding first training speaker, that is, the first preset training text sequence includes the first preset training text and the identity of the corresponding first training speaker. In other words, in the N first preset training text sequences, the first preset training text is corresponding to the identity of the first training speaker in a one-to-one manner. In this embodiment, N first preset training text sequences are adopted, and then there are N first preset training texts. It can be understood that multiple first preset training texts are used for training, the identities of the first training speaker may accordingly be multiple, then the first preset training text sequence of multiple speakers is used for training the attention model, that is, more annotated data (i.e., N first preset training text sequences with the identity of the training speaker) is used for training, so that the obtained trained prediction model can be applied to different speakers, thereby improving the accuracy of the trained prediction model in predicting prosodic pause of the text for different speakers, i.e., improving prediction accuracy of the trained prediction model. Further, it is no longer one speaker corresponding to one prediction model for prediction (i.e., multi-speaker multi-prediction models, in actual applications, multiple prediction models need to be loaded at the same time to deal with prosodic pause prediction of different speakers, which requires more computing resources, resulting waste of resources and not easy to maintain), but the unified trained prediction model is adopted to perform prosodic pause prediction of different speakers, which not only reduces computing resources, but also facilitates maintenance.

For example, N is 10, and the identity of the first training speaker corresponding to each first preset training text may be different. For example, identities of training speakers corresponding to 10 first preset training texts are A1, A2, A3, A4, A5, A6, A7, A8, A9, A10, respectively, and the identities are not all the same. Then, the first preset training text sequence of speakers corresponding to the identities of the above 10 training speakers can be trained.

In addition, in the training process of this embodiment, the first preset training text sequence including the first preset training text and the identity of the first training speaker is used for training, and this may be understood as annotated data (i.e., with the identity of the speaker) for training. Furthermore, the second preset training text without the identity of the speaker is also used for training, i.e., unsupervised training with plain text. In this way, the trained prediction model is obtained by performing multiple trainings through the second preset training text and the first preset training text sequence, and thus the performance of the prediction model can be improved, thereby improving prediction accuracy of the prediction model in the process of obtaining prosodic pause prediction result via prediction.

In one embodiment, obtaining the trained prediction model by performing model training based on N first preset training text sequences and M second preset training texts, includes:

obtaining an initial language model by performing model training according to the M second preset training texts, where the initial language model includes an initial embedding layer and an initial attention model, and an input of the initial attention model includes an output of the initial embedding layer;

obtaining the trained prediction model by training a to-be-trained prediction model based on the N first preset training text sequences; where the to-be-trained prediction model includes a to-be-trained output model and the initial language model, and an input of the to-be-trained output model includes an output of the initial language model.

That is, first, M second preset training texts are used to perform unsupervised training to obtain the initial language model. The initial language model can realize text semantic analysis. It can be understood that the initial language model may be obtained by training a to-be-trained language model according to the M second preset training texts. The to-be-trained language model includes a to-be-trained embedding layer and a to-be-trained attention model. An input of the to-be-trained embedding layer includes the M second preset training texts. An input of the to-be-trained attention model includes an output of the to-be-trained embedding layer.

Then, the N first preset training text sequences are used to train the to-be-trained prediction model, i.e., training the to-be-trained output model and adjusting the initial language model, thereby improving the performance of the prediction model. Specifically, the input of the initial language model includes N first preset training text sequences, and the N first preset training text sequences are input into the initial language model to start the training of the to-be-trained prediction model. In this way, the trained prediction model is obtained by performing multiple trainings through the second preset training text and the first preset training text sequence, and thus the performance of the prediction model can be improved, thereby improving prediction accuracy of the prediction model in the process of obtaining prosodic pause prediction result via prediction.

In one embodiment, performing prosodic pause prediction based on the semantic representation matrix, and outputting a prosodic pause prediction result of each word in the to-be-tested input text, includes:

based on the semantic representation matrix, outputting the prosodic pause prediction result of each word in the to-be-tested input text by the trained output model;

where the trained output model includes a dense layer and an output layer; an input of the dense layer includes the semantic representation matrix; an input of the output layer includes an output of the dense layer; an output of the output layer includes the prosodic pause prediction result of each word in the to-be-tested input text.

Each node of the dense layer is connected to all nodes of an upper layer (the trained attention model in this implementation), and is used to synthesize features extracted by the upper layer and give an output. In this embodiment, the input of the dense layer includes an output of the trained attention model, i.e., the semantic representation matrix. The dense layer performs processing based on the semantic representation matrix and provides an output to the output layer. The output layer performs processing based on the output of the dense layer, and then outputs the prosodic pause prediction result, i.e., the prosodic pause prediction result of each word in the to-be-tested input text in the to-be-tested text sequence. In other words, the dense layer and the output layer process the semantic representation matrix to output the prosodic pause prediction result of the to-be-tested input text. Since the to-be-tested input text may include multiple words, the prosodic pause prediction result of each word can be obtained through the dense layer and the output layer. Based on the semantic representation matrix, the prosodic pause prediction result can be output by the dense layer and the output layer, thereby improving the accuracy of the prosodic pause prediction result.

In an example, the number of dense layers may be multiple, and each dense layer may obtained by training in advance. An input of a first dense layer includes the output of the trained attention model, that is, the first dense layer is used to receive the output of the trained attention model. The input of the output layer includes an output of a last dense layer. When the number of dense layers exceeds 2, remaining dense layers are between the first dense layer and the last dense layer. The multiple dense layers and the output layer process the semantic representation matrix and finally outputs the prosodic pause prediction result. In one example, an activation function in the dense layer may employ ReLU activation function.

In one embodiment, before inputting the first matrix into the trained attention model, the method further includes:

determining a position matrix of the to-be-tested text sequence based on a position of each word in the to-be-tested text sequence in the to-be-tested text sequence;

updating the first matrix by adding the position matrix to the first matrix.

After the first matrix is obtained by the trained embedding layer, the first matrix may be semantically analyzed by the trained attention model to obtain the semantic representation matrix which represents text semantic information of the to-be-tested text sequence. In the process of obtaining the first matrix by mapping the to-be-tested text sequence, the identity of the to-be-tested speaker may also be regarded as text. Words in the to-be-tested text sequence include the words in the to-be-tested input text and the identity of the to-be-tested speaker. The first matrix may be obtained by mapping the to-be-tested input text as well as the identity of the to-be-tested speaker. In this embodiment, the position matrix of the to-be-tested text sequence is considered in the first matrix obtained through the trained embedding layer, i.e., considering the position of each word in the to-be-tested text sequence in the to-be-tested text sequence. The words in the to-be-tested text sequence have corresponding positions. In order to distinguish the positions of the words in the to-be-tested text sequence, in this embodiment, the position matrix with the same dimension as the first matrix can also be added, and then the first matrix and the position matrix are added to update the first matrix. The subsequent semantic analysis process is performed by the trained attention model based on the updated first matrix.

In this embodiment, not only the identity of the to-be-tested speaker is considered on basis of the to-be-tested input text, but also position information of the to-be-tested text sequence is considered. In other words, both the speaker and position of to-be-tested text sequence are considered, thereby improving the prediction accuracy of the prediction process.

The process of the above prosodic pause prediction method will be described hereinafter in detail with a specific embodiment. For example, the attention model employs the transformer model as an example for illustration. The above prosodic pause prediction method may be applied to a speech synthesis system, specifically an electronic device. The electronic device may be an electronic device capable of speech synthesis, such as a computer, mobile terminal, server, wearable device, automobile. After outputting the prosodic pause prediction result of each word in the to-be-tested input text, speech synthesis can be performed based on the to-be-tested input text and the prosodic pause prediction result of each word in the to-be-tested input text, thereby obtaining a voice that matches the to-be-tested speaker, i.e., the obtained voice is corresponding to the identity of the to-be-tested speaker, which may also be understood that the output voice matches the to-be-tested speaker.

Figure 2:
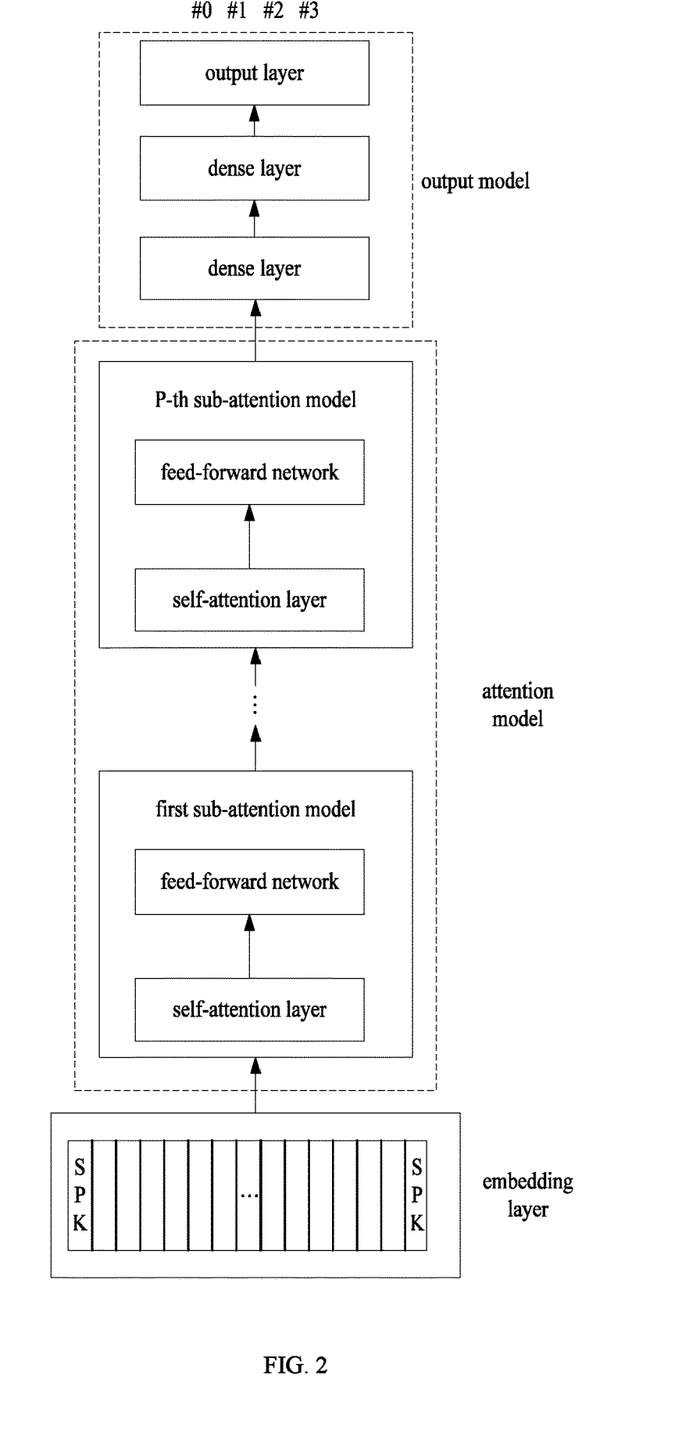
FIG. 2 is a schematic diagram showing prosodic pause prediction according to an embodiment of the present application.

As shown in FIG. 2, first, a first matrix is obtained by mapping a to-be-tested text sequence including a to-be-tested text and an identity (SPK) of a to-be-tested speaker through a trained embedding layer. In the to-be-tested text sequence, the number of identities of the to-be-tested speaker is two and the two identities of the to-be-tested speaker are the same, such as SPK shown in FIG. 2. The to-be-tested input text is between the two identities of the to-be-tested speaker. Then, the first matrix is input into a trained attention model (transformer model) for semantic analysis, thereby obtaining a semantic representation matrix. And then, the semantic representation matrix is input into dense layers of a trained output model. As shown in 2, the number of dense layers is 2, that is, there are 2 dense layers. An output of the dense layers based on the semantic representation matrix is input to an output layer. The output layer outputs a prosodic pause prediction result. Further, unsupervised training may be first performed through a second preset training text sequence to obtain an initial embedding layer and an initial attention model; then, a to-be-trained output model, the initial embedding layer and the initial attention model can be trained through a first preset training text sequence, thereby adjusting the initial embedding layer and the initial attention model, and improving the accuracy of the obtained prediction model.

An input of the trained attention model includes an output (i.e., the first matrix) of the trained embedding layer. An input of the dense layer includes an output of the trained attention model. The attention model may include P sub-attention models, where P may be an integer greater than 0. The value of P may be selected according to the application scenario or actual requirements, which is not limited herein. Each sub-attention model includes a self-attention layer and a feed-forward network (FFN). An input of the feed-forward network includes an output of the self-attention layer which belongs to the same sub-attention model as the feed-forward network. An input of a first sub-attention model in the attention model includes an output of the embedding layer. Understandably, an input of the self-attention layer in the first sub-attention model includes the output of the embedding layer, and the input of the dense layer includes an output of a P-th sub-attention model. The output of the P-th sub-attention model is the output of the attention model. The dense layer processes the output of the attention model and outputs it to the output layer. The output layer outputs the prosodic pause prediction result of each word in to-be-tested text sequence. The prosodic pause levels may include 4 levels, including, for example, #0 (no prosodic pause), #1 (prosodic word), #2 (prosodic phrase) and #3 (intonation prosody), which are shown in FIG. 2 and represent different levels. The prosodic pause prediction result of one word in the to-be-tested input text may be one of the above four levels.

Further, before the trained attention model analyzes the first matrix to determine the semantic representation matrix, the trained attention model may add the position matrix of the to-be-tested text sequences on the basis of the first matrix, thereby distinguishing positions of the to-be-tested text sequences and then improving the prediction accuracy.

Through the prosodic pause prediction method of the above embodiment, the prosodic pause of the to-be-tested text sequence is predicted by the prediction model including the trained embedding layer, the trained attention model and the trained output model. In the prediction process, the identity of the speaker is fully considered, and position information of the to-be-tested text sequence is also considered, thereby improving the accuracy of the prosodic pause prediction.

Figure 3:
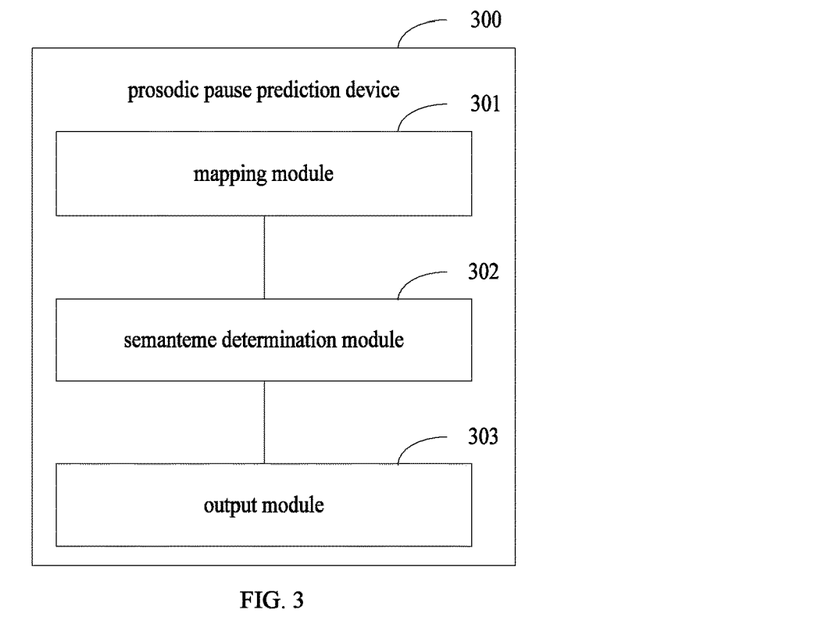
FIG. 3 is a first schematic diagram of a prosodic pause prediction device according to an embodiment of the present application.

Referring to FIG. 3, the present application provides an embodiment of a prosodic pause prediction device 300, which includes:

a mapping module 301 used to map a to-be-tested text sequence through a trained embedding layer to obtain a first matrix; where the to-be-tested text sequence includes a to-be-tested input text and an identity of a to-be-tested speaker;

a semanteme determination module 302 used to input the first matrix into a trained attention model, and determine a semantic representation matrix by the trained attention model; and an output module 303 used to perform prosodic pause prediction based on the semantic representation matrix and output a prosodic pause prediction result of each word in the to-be-tested input text.

Figure 4:
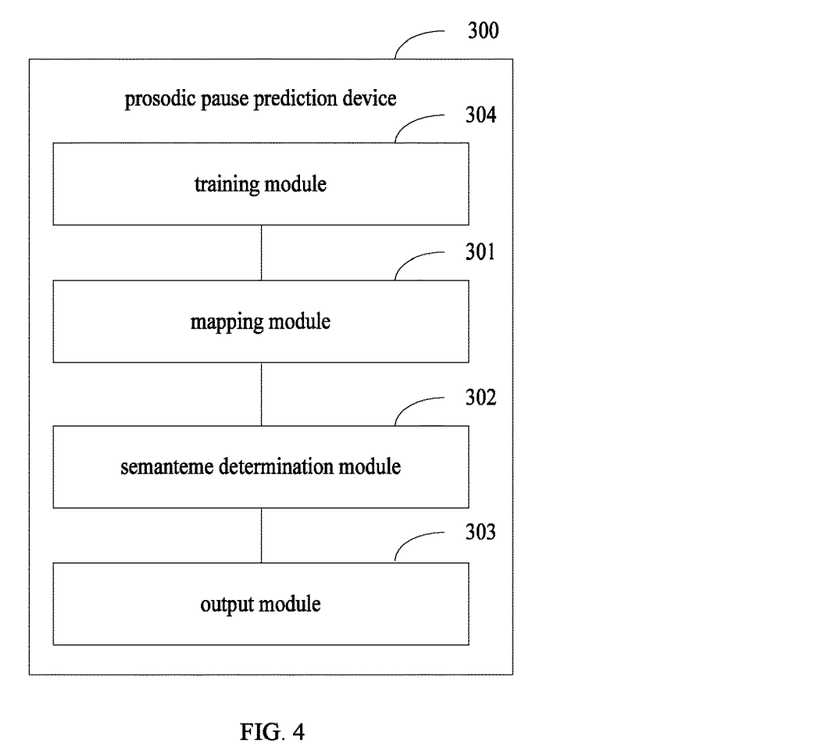
FIG. 4 is a second schematic diagram of a prosodic pause prediction device according to an embodiment of the present application.

Referring to FIG. 4, in one embodiment, the device further includes:

a training module 304 used to perform model training based on N first preset training text sequences and M second preset training texts to obtain the trained prediction model.

N and M are integers greater than 1. The first preset training text sequence includes a first preset training text and an identity of a first training speaker. The trained prediction model includes the trained embedding layer, the trained attention model and the trained output model. An input of the trained embedding layer includes the to-be-tested text sequence. An input of the trained attention model includes an output of the trained embedding layer. An input of the trained output model includes an output of the attention model. An output of the trained output model includes the prosodic pause prediction of each word in the to-be-tested input text.

Figure 5:
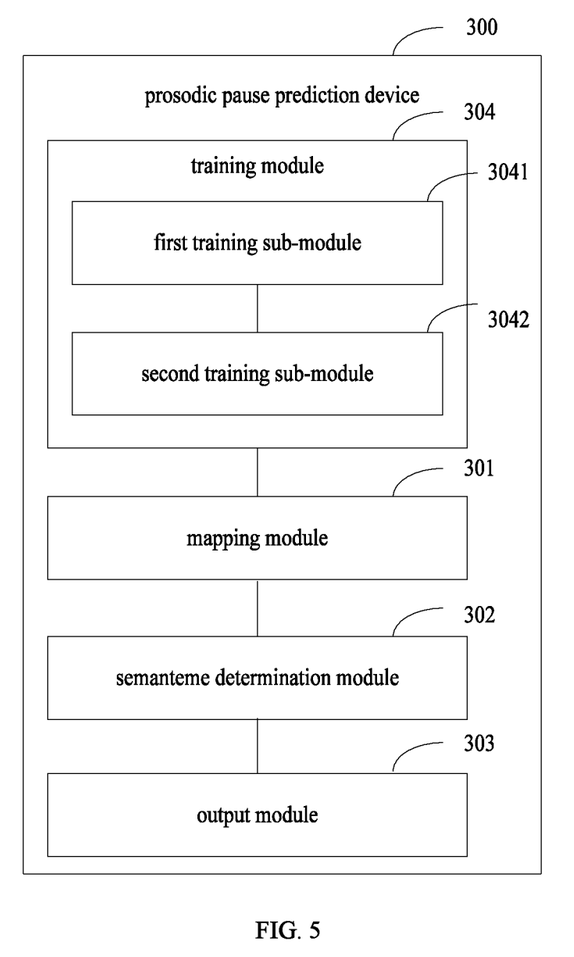
FIG. 5 is a third schematic diagram of a prosodic pause prediction device according to an embodiment of the present application.

Referring to FIG. 5, in one embodiment, the training module 304 includes:

a first training sub-module 3041 used to perform model training according to the M second preset training texts to obtain an initial language model; where the initial language model includes an initial embedding layer and an initial attention model, and an input of the initial attention model includes an output of the initial embedding layer;

a second training sub-module 3042 used to train a to-be-trained model based on the N first preset training text sequences to obtain the trained prediction model; where the to-be-trained model includes a to-be-trained output model and the initial language model, and an input of the to-be-trained output model includes an output of the initial language model.

In one embodiment, the output module 303 is used to, based on the semantic representation matrix, output the prosodic pause prediction result of each word in the to-be-tested input text by the trained output model;

where the trained output model includes a dense layer and a trained output layer; an input of the trained dense layer includes the semantic representation matrix; an input of the trained output layer includes an output of the trained dense layer; an output of the trained output layer includes the prosodic pause prediction result of each word in the to-be-tested input text.

Figure 6:
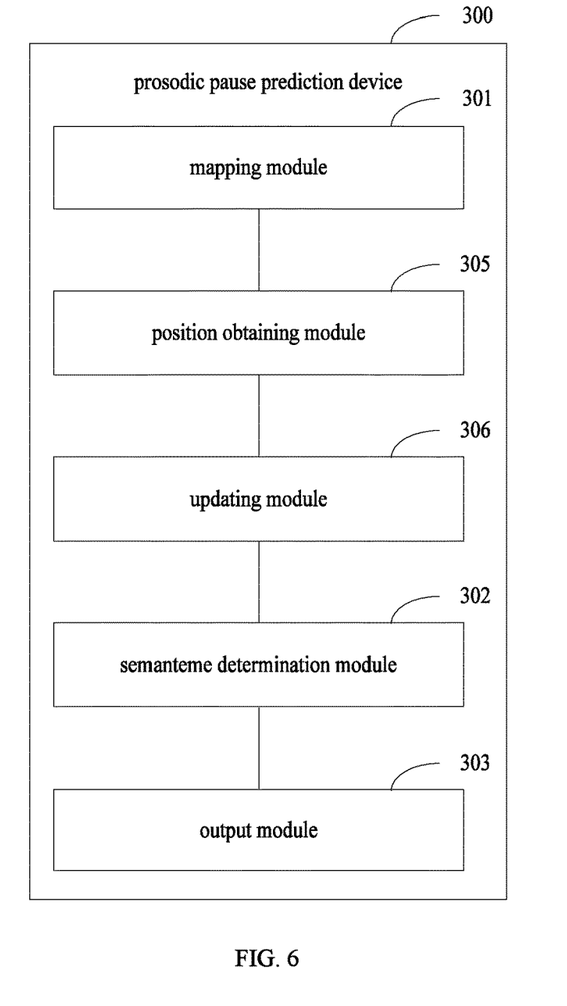
FIG. 6 is a fourth schematic diagram of a prosodic pause prediction device according to an embodiment of the present application.

Referring to FIG. 6, in one embodiment, the device further includes:

a position obtaining module 305 used to, determine a position matrix of the to-be-tested text sequence based on a position of each word in the to-be-tested text sequence in the to-be-tested text sequence, before the semantic determination module 302 inputs the first matrix into the trained attention model and determines the semantic representation matrix by the trained attention model;

an updating module 306 used to update the first matrix by adding the position matrix to the first matrix.

The prosodic pause prediction devices of the foregoing various embodiments are devices for implementing the prosodic pause prediction methods of the foregoing various embodiments, and have the same technical features as well as the same technical effects, which will not be repeated herein.

According to one embodiment of the present application, the present application further provides an electronic device and a readable storage medium.

Figure 7:
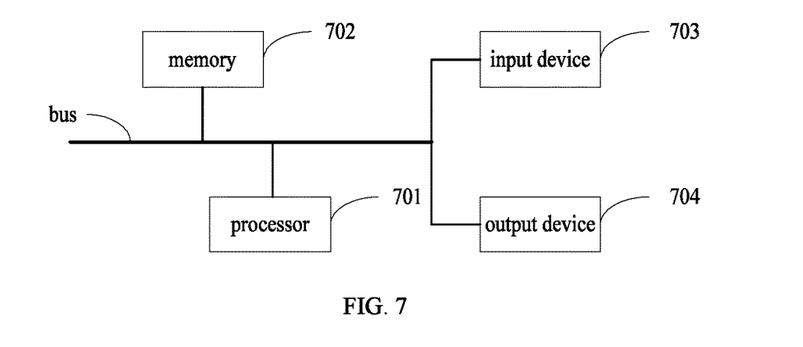
FIG. 7 is a block diagram of an electronic device for implementing the prosodic pause prediction device according to an embodiment of the present application.

As shown in FIG. 7, it is a block diagram of an electronic device for implementing the prosodic pause prediction device according to an embodiment of the present application. The electronic device is intended to represent various forms of digital computers, such as laptop computer, desktop computer, workbench, personal digital assistant, server, blade server, mainframe computer and other suitable computers. The electronic device may also represent various forms of mobile devices, such as personal digital processing, cellular phone, smart phone, wearable device and other similar computing devices. The components shown here, their connections and relationships and their functions are merely examples, and are not intended to limit the implementation described in the application and/or claimed herein.

As shown in FIG. 7, the electronic device includes: one or more processors 701, a memory 702, and interfaces for connecting various components, including a high-speed interface and a low-speed interface. The various components are coupled with each other through different buses, and may be installed on a common motherboard or in other ways as needed. The processor may process instructions executed within the electronic device, including instructions stored in or on the memory to display graphical information of GUI on external input/output devices (such as a display device coupled to the interface). In other embodiments, multiple processors and/or multiple buses may be used together with multiple memories if desired. Similarly, multiple electronic devices may be connected, and each device provides some necessary operations (for example, as a server array, a group of blade servers, or a multi-processor system). In FIG. 7, one processor 701 is taken as an example.

The memory 702 is a non-transitory computer-readable storage medium provided in the present application. The memory stores instructions executable by at least one processor to enable the at least one processor to implement the prosodic pause prediction method provided in the present application. The non-transitory computer-readable storage medium of the present application stores computer instructions for causing a computer to implement the prosodic pause prediction method provided in the present application.

The memory 702 is a non-transitory computer-readable storage medium, and may be used to store a non-transitory software program, a non-transitory computer executable program and modules, such as program instructions/modules corresponding to the prosodic pause prediction method in the embodiments of the present application (for example, the mapping module 301, the semanteme determination module 302 and the output module 303 shown in FIG. 3). The processor 701 runs the non-transitory software program, instructions and modules stored in the memory 702 to execute various functional applications and data processing of the server, that is, to implement the prosodic pause prediction method in the foregoing method embodiment.

The memory 702 may include a program storage area and a data storage area. The program storage area may store an operating system and application programs required by at least one function. The data storage area may store data created according to the use of the electronic device. In addition, the memory 702 may include a high-speed random access memory, and may also include a non-transitory memory, such as at least one of a magnetic disk storage device, a flash memory device, or other non-transitory solid-state storage device. In some embodiments, the memory 702 optionally includes memories remotely set with respect to the processor 701, and these remote memories may be connected to an electronic device through a network. Examples of the above network include but not limited to the internet, intranet, local area network, mobile communication network, and combinations thereof.

The electronic device for the prosodic pause prediction method may further include: an input device 703 and an output device 704. The processor 701, the memory 702, the input device 703 and the output device 704 may be connected through a bus or in other ways. In FIG. 7, connection through a bus is used as an example.

The input device 703 may receive input numeric or character information, and generate key signal input related to user settings and function control of electronic devices, such as touch screen, keypad, mouse, trackpad, touchpad, pointing stick, one or more mouse buttons, trackball, joystick and other input devices. The output device 804 may include a display device, an auxiliary lighting device (for example, LED), a tactile feedback device (for example, a vibration motor). The display device may include, but not limited to, a liquid crystal display (LCD), a light emitting diode (LED) display and a plasma display. In some embodiments, the display device may be a touch screen.

Various implementations of systems and techniques described herein may be implemented in a digital electronic circuit system, an integrated circuit system, a dedicated application specific integrated circuit (ASIC), computer hardware, firmware, software, and/or combinations thereof. These various implementations may include: being implemented in one or more computer programs, which may be executed and/or parsed on a programmable system including at least one programmable processor. The programmable processor may be a dedicated or general-purpose programmable processor, and may receive data and instructions from a storage system, at least one input device and at least one output device, and transmit the data and instructions to the storage system, the at least one input device and the at least one output device.

These computer programs (also called programs, software, software applications, or codes) include machine instructions of a programmable processor, and these computer programs may be implemented using process and/or object-oriented programming languages, and/or assembly/machine languages. As used herein, the terms "machine-readable medium" and "computer-readable medium" refer to any computer program product, device, and/or device (for example, magnetic disk, optical disk, memory, programmable logic devices (PLD)) used to provide machine instructions and/or data to a programmable processor, including machine-readable media that receives machine instructions as machine-readable signals. The term "machine-readable signal" refers to any signal used to provide machine instructions and/or data to a programmable processor.

In order to provide interaction with the user, the system and technology described herein may be implemented on a computer. The computer includes: a display device (for example, cathode ray tube (CRT) or liquid crystal display (LCD) monitor) for displaying information to the user; and a keyboard and a pointing device (for example, a mouse or a trackball). The user can use the keyboard and the pointing device to provide input to the computer. Other kinds of devices may also be used to provide interaction with the user, for example, the feedback provided to the user may be any form of sensory feedback (for example, visual feedback, auditory feedback, or tactile feedback), and any form (including acoustic input, voice input, or tactile input) may be used to receive input from the user.

The systems and techniques described herein may be implemented in a computing system that includes back-end components (for example, as a data server), or a computing system that includes middleware components (for example, as an application server), or a computing system that includes front-end components (for example, a user computer with a graphical user interface or a web browser, through which the user may interact with the implementation of the systems and technologies described herein), or a computing system that includes any combination of the back-end components, the middleware components or the front-end components. The components of the system may be interconnected by any form or medium of digital data communication (for example, communication network). Examples of the communication network include: local area network (LAN), wide area network (WAN), and the internet.

The computer system may include a client and a server. The client and the server are generally far from each other and usually interact through a communication network. The client-server relationship is generated by running computer programs that have a client-server relationship with each other, on corresponding computers.

According to the technical solutions of the embodiments of the present application, when a width of the electronic device is greater than a first preset width, a first sub-keyboard and a second sub-keyboard can be generated. The first sub-keyboard and the second sub-keyboard may be displayed at an interval, i.e., there is a gap between the first sub-keyboard and the second sub-keyboard. In this way, the user does not need to perform key operations in the gap, so that the user can easily reach the keys in the keyboard during operation, which can shorten the user's operation path, thereby improving input efficiency.

It should be understood that steps may be reordered, added or deleted through the various forms of processes shown above. For example, the steps described in the present application may be performed in parallel, sequentially, or in different orders, as long as the desired results of the technical solutions disclosed in the present application can be achieved, which is not limited herein.

The above specific embodiments do not constitute a limitation to the protection scope of the present application. Those skilled in the art should understand that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A prosodic pause prediction method comprising:
   obtaining a first matrix by mapping a to-be-tested text sequence through a trained embedding layer; wherein the to-be-tested text sequence comprises a to-be-tested input text and an identity of a to-be-tested speaker;
   inputting the first matrix into a trained attention model, and determining a semantic representation matrix by the trained attention model; and
   performing prosodic pause prediction based on the semantic representation matrix and outputting a prosodic pause prediction result of each word in the to-be-tested input text;
   wherein before the obtaining a first matrix by mapping a to-be-tested text sequence through a trained embedding layer, the method further comprises:
   obtaining a trained prediction model by performing model training based on N first preset training text sequences and M second preset training texts;
   wherein N and M are integers greater than 1; the first preset training text sequence comprises a first preset training text and an identity of a first training speaker; the trained prediction model comprises the trained embedding layer, the trained attention model and a trained output model; an input of the trained embedding layer comprises the to-be-tested text sequence; an input of the trained attention model comprises an output of the trained embedding layer; an input of the trained output model comprises an output of the attention model; an output of the trained output model comprises the prosodic pause prediction of each word in the to-be-tested input text.

2. The method according to claim 1, wherein the obtaining a trained prediction model by performing model training based on N first preset training text sequences and M second preset training texts, comprises:
   obtaining an initial language model by performing model training according to the M second preset training texts; wherein the initial language model comprises an initial embedding layer and an initial attention model, and an input of the initial attention model comprises an output of the initial embedding layer;
   obtaining the trained prediction model by training a to-be-trained prediction model based on the N first preset training text sequences; wherein the to-be-trained prediction model comprises a to-be-trained output model and the initial language model, and an input of the to-be-trained output model comprises an output of the initial language model.

3. The method according to claim 1, wherein the performing prosodic pause prediction based on the semantic representation matrix and outputting a prosodic pause prediction result of each word in the to-be-tested input text, comprises:
   based on the semantic representation matrix, outputting the prosodic pause prediction result of each word in the to-be-tested input text by a trained output model;
   wherein the trained output model comprises a trained dense layer and a trained output layer; an input of the trained dense layer comprises the semantic representation matrix; an input of the trained output layer comprises an output of the trained dense layer; an output of the trained output layer comprises the prosodic pause prediction result of each word in the to-be-tested input text.

4. The method according to claim 1, wherein before the inputting the first matrix into a trained attention model, the method further comprises:
   determining a position matrix of the to-be-tested text sequence based on a position of each word in the to-be-tested text sequence in the to-be-tested text sequence; and
   updating the first matrix by adding the position matrix to the first matrix.

5. A non-transitory computer-readable storage medium comprising computer instructions stored thereon; wherein the computer instructions are configured to enable a computer to perform the method according to claim 1.

6. A prosodic pause prediction device comprising:
   a mapping module configured to map a to-be-tested text sequence through a trained embedding layer to obtain a first matrix; wherein the to-be-tested text sequence comprises a to-be-tested input text and an identity of a to-be-tested speaker;
   a semanteme determination module configured to input the first matrix into a trained attention model and determine a semantic representation matrix by the trained attention model; and
   an output module configured to perform prosodic pause prediction based on the semantic representation matrix and output a prosodic pause prediction result of each word in the to-be-tested input text;
   wherein the device further comprises:

a training module configured to perform model training based on N first preset training text sequences and M second preset training texts to obtain the trained prediction model;
wherein N and M are integers greater than 1; the first preset training text sequence comprises a first preset training text and an identity of a first training speaker; the trained prediction model comprises the trained embedding layer, the trained attention model and a trained output model; an input of the trained embedding layer comprises the to-be-tested text sequence; an input of the trained attention model comprises an output of the trained embedding layer; an input of the trained output model comprises an output of the attention model; an output of the trained output model comprises the prosodic pause prediction of each word in the to-be-tested input text.

7. The device according to claim 6, wherein the training module comprises:
a first training sub-module configured to perform model training according to the M second preset training texts to obtain an initial language model; wherein the initial language model comprises an initial embedding layer and an initial attention model, and an input of the initial attention model comprises an output of the initial embedding layer;
a second training sub-module configured to train a to-be-trained model based on the N first preset training text sequences to obtain the trained prediction model; wherein the to-be-trained model comprises a to-be-trained output model and the initial language model, and an input of the to-be-trained output model comprises an output of the initial language model.

8. The device according to claim 6, wherein the output module is configured to, based on the semantic representation matrix, output the prosodic pause prediction result of each word in the to-be-tested input text by a trained output model;
wherein the trained output model comprises a trained dense layer and a trained output layer; an input of the trained dense layer comprises the semantic representation matrix; an input of the trained output layer comprises an output of the trained dense layer;
an output of the trained output layer comprises the prosodic pause prediction result of each word in the to-be-tested input text.

9. The device according to claim 6, wherein the device further comprises:
a position obtaining module configured to, determine a position matrix of the to-be-tested text sequence based on a position of each word in the to-be-tested text sequence in the to-be-tested text sequence, before the semantic determination module inputs the first matrix into the trained attention model and determines the semantic representation matrix by the trained attention model;
an updating module configured to update the first matrix by adding the position matrix to the first matrix.

10. An electronic device comprising:
at least one processor; and
a memory in communication with the at least one processor;
wherein the memory stores instructions executable by the at least one processor, the instructions are executed by the at least one processor to enable the at least one processor to perform a prosodic pause prediction method which comprises:

obtaining a first matrix by mapping a to-be-tested text sequence through a trained embedding layer; wherein the to-be-tested text sequence comprises a to-be-tested input text and an identity of a to-be-tested speaker;
inputting the first matrix into a trained attention model, and determining a semantic representation matrix by the trained attention model; and
performing prosodic pause prediction based on the semantic representation matrix and outputting a prosodic pause prediction result of each word in the to-be-tested input text;
wherein before the obtaining a first matrix by mapping a to-be-tested text sequence through a trained embedding layer, the processor is configured to,
obtain a trained prediction model by performing model training based on N first preset training text sequences and M second preset training texts;
wherein N and M are integers greater than 1; the first preset training text sequence comprises a first preset training text and an identity of a first training speaker; the trained prediction model comprises the trained embedding layer, the trained attention model and a trained output model; an input of the trained embedding layer comprises the to-be-tested text sequence; an input of the trained attention model comprises an output of the trained embedding layer; an input of the trained output model comprises an output of the attention model; an output of the trained output model comprises the prosodic pause prediction of each word in the to-be-tested input text.

11. The electronic device according to claim 10, wherein when the processor obtains the trained prediction model by performing model training based on N first preset training text sequences and M second preset training texts, the processor is configured to,
obtain an initial language model by performing model training according to the M second preset training texts; wherein the initial language model comprises an initial embedding layer and an initial attention model, and an input of the initial attention model comprises an output of the initial embedding layer;
obtain the trained prediction model by training a to-be-trained prediction model based on the N first preset training text sequences; wherein the to-be-trained prediction model comprises a to-be-trained output model and the initial language model, and an input of the to-be-trained output model comprises an output of the initial language model.

12. The electronic device according to claim 10, wherein when the processor performs prosodic pause prediction based on the semantic representation matrix and output the prosodic pause prediction result of each word in the to-be-tested input text, the processor is configured to,
based on the semantic representation matrix, output the prosodic pause prediction result of each word in the to-be-tested input text by a trained output model;
wherein the trained output model comprises a trained dense layer and a trained output layer; an input of the trained dense layer comprises the semantic representation matrix; an input of the trained output layer comprises an output of the trained dense layer; an output of the trained output layer comprises the prosodic pause prediction result of each word in the to-be-tested input text.

13. The electronic device according to claim 10, wherein before the inputting the first matrix into a trained attention model, the processor is configured to, determine a position matrix of the to-be-tested text sequence based on a position of each word in the to-be-tested text sequence in the to-be-tested text sequence; and update the first matrix by adding the position matrix to the first matrix.

\* \* \* \* \*